(12) United States Patent
Fransen et al.

(10) Patent No.: US 7,510,421 B2
(45) Date of Patent: Mar. 31, 2009

(54) PIVOTING STRAIN RELIEF BAR FOR DATA PATCH PANELS

(75) Inventors: Robert E. Fransen, Homer Glen, IL (US); Mark J. Donnell, Orland Park, IL (US); Paul M. Herbst, Frankfort, IL (US)

(73) Assignee: Panduit Corp., Tinley Park, IL (US)

( * ) Notice: Subject to any disclaimer, the term of this patent is extended or adjusted under 35 U.S.C. 154(b) by 0 days.

(21) Appl. No.: 11/837,165

(22) Filed: Aug. 10, 2007

(65) Prior Publication Data

US 2009/0038845 A1  Feb. 12, 2009

(51) Int. Cl.
*H01R 13/58* (2006.01)
(52) U.S. Cl. ..................................................... 439/449
(58) Field of Classification Search ............... 439/540.1, 439/719; 174/72 A; 385/135; 211/26; 361/826
See application file for complete search history.

(56) References Cited

U.S. PATENT DOCUMENTS

| | | | |
|---|---|---|---|
| 3,356,432 A | 12/1967 | Stroud et al. | |
| 5,401,193 A | 3/1995 | Lo Cicero et al. | |
| 5,575,665 A | 11/1996 | Shramawick et al. | |
| 5,836,551 A | 11/1998 | Orlando | |
| 6,086,415 A * | 7/2000 | Sanchez et al. | 439/540.1 |
| 6,193,341 B1 | 2/2001 | Eizadkhah et al. | |
| 6,556,762 B1 | 4/2003 | Erickson et al. | |
| 6,568,542 B1 | 5/2003 | Chen | |
| 6,600,106 B2 | 7/2003 | Standish et al. | |
| 6,818,834 B1 | 11/2004 | Lin | |
| 7,091,418 B1 | 8/2006 | Clark et al. | |
| 7,097,047 B2 | 8/2006 | Lee et al. | |
| 7,352,947 B2 * | 4/2008 | Phung et al. | 385/135 |
| 2004/0035983 A1 | 2/2004 | Simonson et al. | |
| 2006/0018622 A1 | 1/2006 | Caveney et al. | |
| 2006/0160431 A1 | 7/2006 | Herbst et al. | |
| 2006/0168759 A1* | 8/2006 | Laursen | 16/358 |

* cited by examiner

*Primary Examiner*—Neil Abrams
*Assistant Examiner*—Phuong Nguyen
(74) *Attorney, Agent, or Firm*—Robert A. McCann; Christopher S. Clancy

(57) ABSTRACT

A pivoting strain relief bar assembly that is comprised of a patch panel rotatably coupled to a strain relief bar, where the patch panel and strain relief bar are also coupled to a conventional rack capable of supporting telecommunications or other electronic equipment. Cables that are to be terminated to the patch panel are secured to and supported by the strain relief bar. The strain relief bar is capable of locking in a substantially horizontal position and thus remains fixed while supporting a large number of network cables. The strain relief bar can also be unlocked and rotated, allowing a technician to access the patch panel without having to unnecessarily disconnect cables.

14 Claims, 10 Drawing Sheets

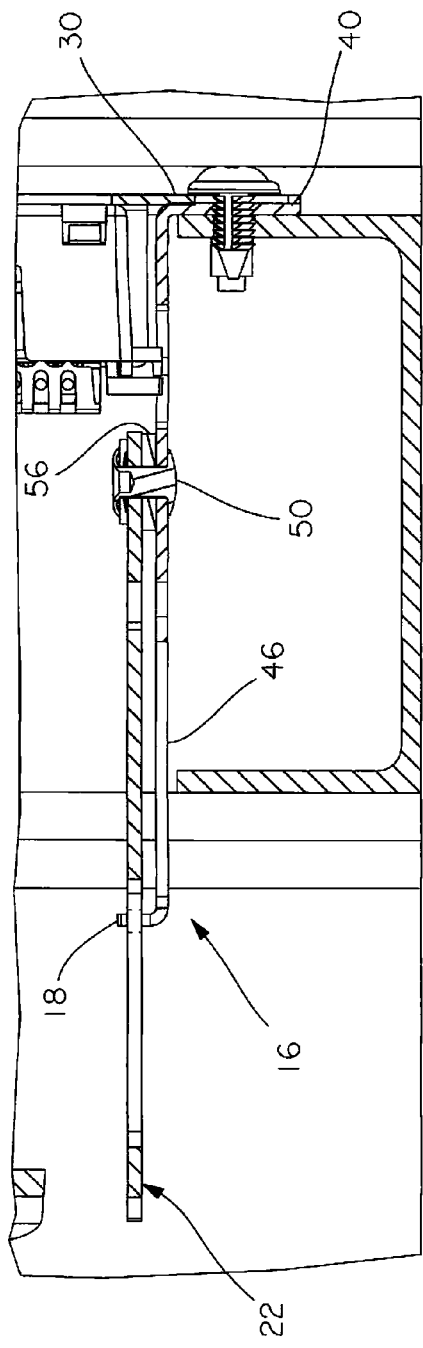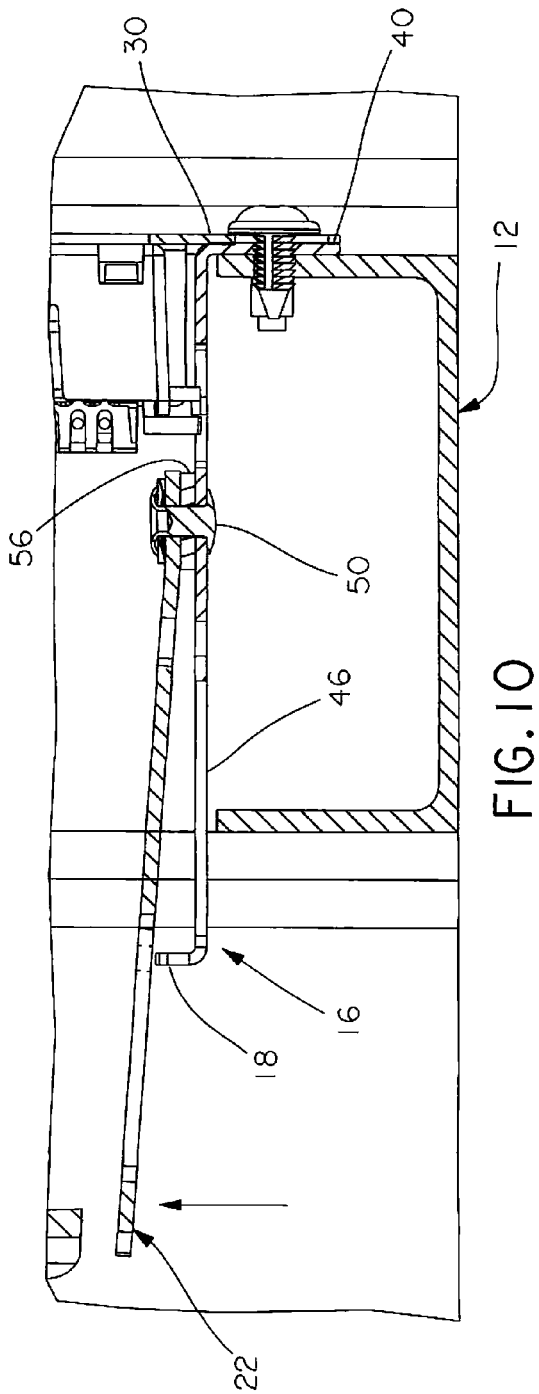

PIVOTING STRAIN RELIEF BAR FOR DATA PATCH PANELS

FIELD OF THE PRESENT INVENTION

The Present Invention is directed to a device used to organize and support network cables and, more particularly, to a strain relief bar rotatably coupled to a data patch panel.

BACKGROUND OF THE PRESENT INVENTION

Local area networks and telecommunications connections often use data patch panels to enable inter or cross-connection between telecommunications equipment. Patch panels typically comprise a frame member having a plurality of connector locations wherein any of a plurality of jacks may be mounted. The jacks allow for rapid connection and disconnection of network cable between jacks in the same patch panel or between jacks located on different patch panels.

If network cables are haphazardly connected directly into the patch panel, many problems would result. Typically, the terminations at the terminal end of network cables are designed only to maintain a mating relationship with the jack. Excessive loads, such as a downward shear force due to the unsupported weight of the loose network cable, can overstress the cable terminations, causing them to break or disengage from the jack, resulting in the need to repair or replace the termination or the entire cable. Additionally, due to the heavy weight of the network cable, a small bending radius results where the cable bends downward under the influence of gravity near the point where the cable termination is connected to the jack. This tight bending radius can result in physical damage to the cable itself, or can lead to cable performance degradation. Finally, when a large number of cables are haphazardly routed to the patch panels, technicians would be unable to quickly disconnect and reconnect a group of cables and, thus, valuable time and money would be wasted whenever routine maintenance tasks were undertaken.

Various means have been developed to physically support and assist in the organization of network cables routed to a patch panel, such as the device illustrated in U.S. Pat. No. 6,600,106, entitled "Cable Management Bar and Patch Panel," filed on 11 Jul. 2001 and issued to Standish et al. on 29 Jul. 2003 (the "'106 patent"). The '106 patent discloses a support bar that extends horizontally from the patch panel and is disposed in a direction that is generally normal to the longitudinal axis of the individual network cable strands. Network cable is connected to the support bar using conventional fasteners and is thus supported at a location near the point where the cable plug is inserted into the patch panel jack. As a result of this support, the cable does not sag at the point of entry into the jack and the large stresses on the cable plug, as well as the tight bending radius in the cable, are eliminated. Additionally, the support bar of the '106 patent allows for the cables to be organized, providing for the speedy identification of the terminal end of a particular cable and resulting in a reduction in the overall volume of the cable bundle, conserving valuable storage space.

However, the device of the '106 patent, and similar variants, is not without shortcomings. Specifically, the fixed horizontal bar blocks access to the jacks on the patch panel. When a technician must connect or disconnect cables from the jacks of the patch panels, the support bar of the '106 patent must be removed, requiring the disconnection, and ultimate reconnection, of all cables connected to the support bar from the jacks. This process is cumbersome and time-consuming for the technician, who often must consult a diagram to ensure that the correct cables are inserted into the correct jacks.

U.S. Pat. No. 5,575,665, entitled "Patch Panel with Hinged Tie Bar," filed on 1 Dec. 1995 and issued to Shramawick et al. on 19 Nov. 1996 (the "'665 patent"), attempted to overcome the problems associated with the '106 patent. The '665 patent discloses a horizontally disposed support bar that is rotatably coupled to a fixed hinge on the patch panel. The '665 patent is designed to allow the support bar to be rotated, thus moving the cables away from the patch panel and allowing the technician to access a specific area on the patch panel without removing unnecessary cables.

However, the '665 patent suffers from several drawbacks. Specifically, resistance to the rotation of the support bar is provided by friction and the support bar is thus unable to lock in any position. When using heavier network cable, such as Cat6 cable, the weight of the cable tends to pivot the support bar downward during normal operation of the support bar. This gradual downward rotation could block access to adjacent patch panels, resulting in the need for a technician to reposition multiple support bars in order to access a specific patch panel. Additionally, this gradual rotation of support bars could result in the pinching of network cables between adjacent support bars. Since the support bars are typically constructed from stamped sheet metal, the pinching of the cables could result in damage to the cables, requiring costly cable repair or replacement.

Thus, it would be desirable to provide an inexpensive and convenient means to quickly organize and support groups of cables that are routed into a patch panel using a pivoting support bar, and to additionally provide a means to prevent gradual rotation of the support bar while allowing for a fast and convenient method to unlock the support bar and rotate it to a convenient position.

SUMMARY OF THE PRESENT INVENTION

A pivoting strain relief bar assembly that is comprised of a patch panel rotatably coupled to a strain relief bar, where the patch panel and strain relief bar are also coupled to a conventional rack capable of supporting telecommunications or other electronic equipment. Cables that are to be terminated to the patch panel are secured to and supported by the strain relief bar. The strain relief bar is capable of locking in a substantially horizontal position and thus remains fixed while supporting a large number of network cables. The strain relief bar can also be unlocked and rotated, allowing a technician to access the patch panel without having to unnecessarily disconnect cables.

BRIEF DESCRIPTION OF THE FIGURES

FIG. 9 illustrates a sectional view of the connection between a side bracket and the strain relief bar of the pivoting strain relief bar assembly of FIG. 4 in the horizontal locked configuration:

FIG. 10 illustrates a sectional view of the connection between a side bracket and the strain relief bar of the pivoting strain relief bar assembly of FIG. 4 in the unlocked configuration;

DETAILED DESCRIPTION OF THE PREFERRED EMBODIMENTS

The illustrated embodiments of the Present Invention are directed to a pivoting strain relief bar assembly for organizing and supporting network data cables.

Figure 1:
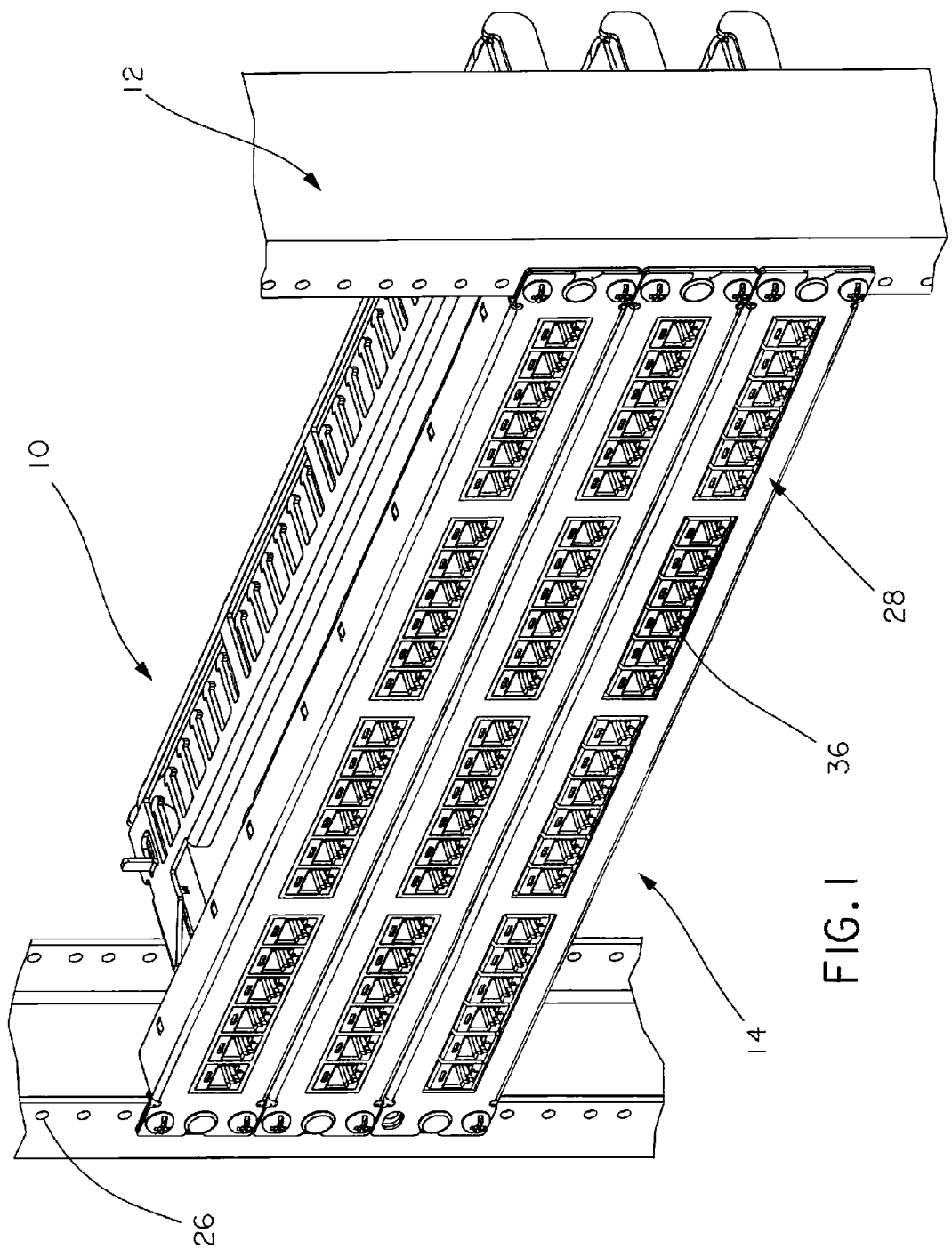
FIG. 1 illustrates a front perspective view of the pivoting strain relief bar assembly in the horizontal locked configuration and coupled to a support rack, manufactured in accordance with the tenets and teachings of the Present Invention.
Figure 2:
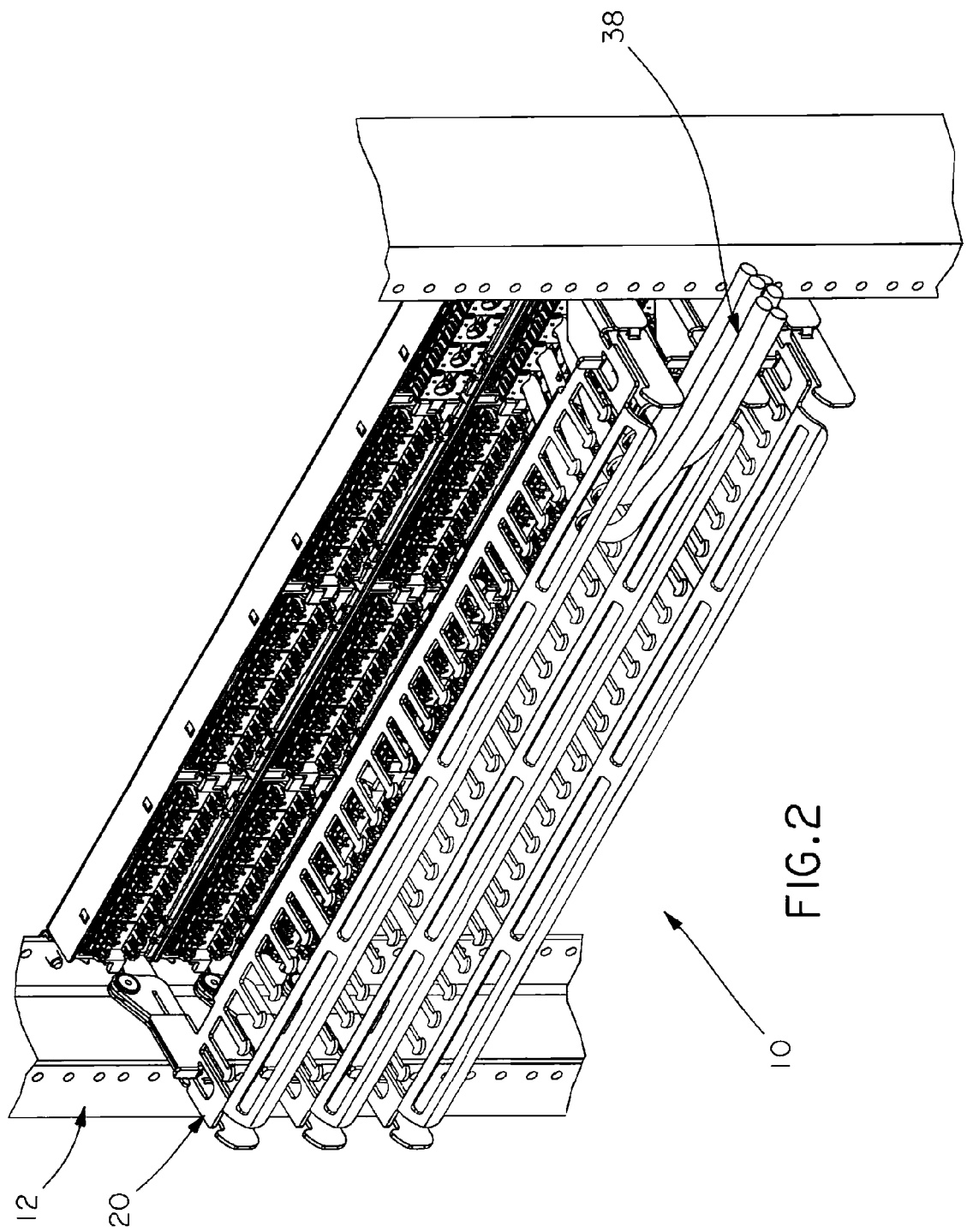
FIG. 2 illustrates a rear perspective view of multiple pivoting strain relief bar assemblies of FIG. 1 coupled to a support rack, each in the horizontal locked configuration.
Figure 3:
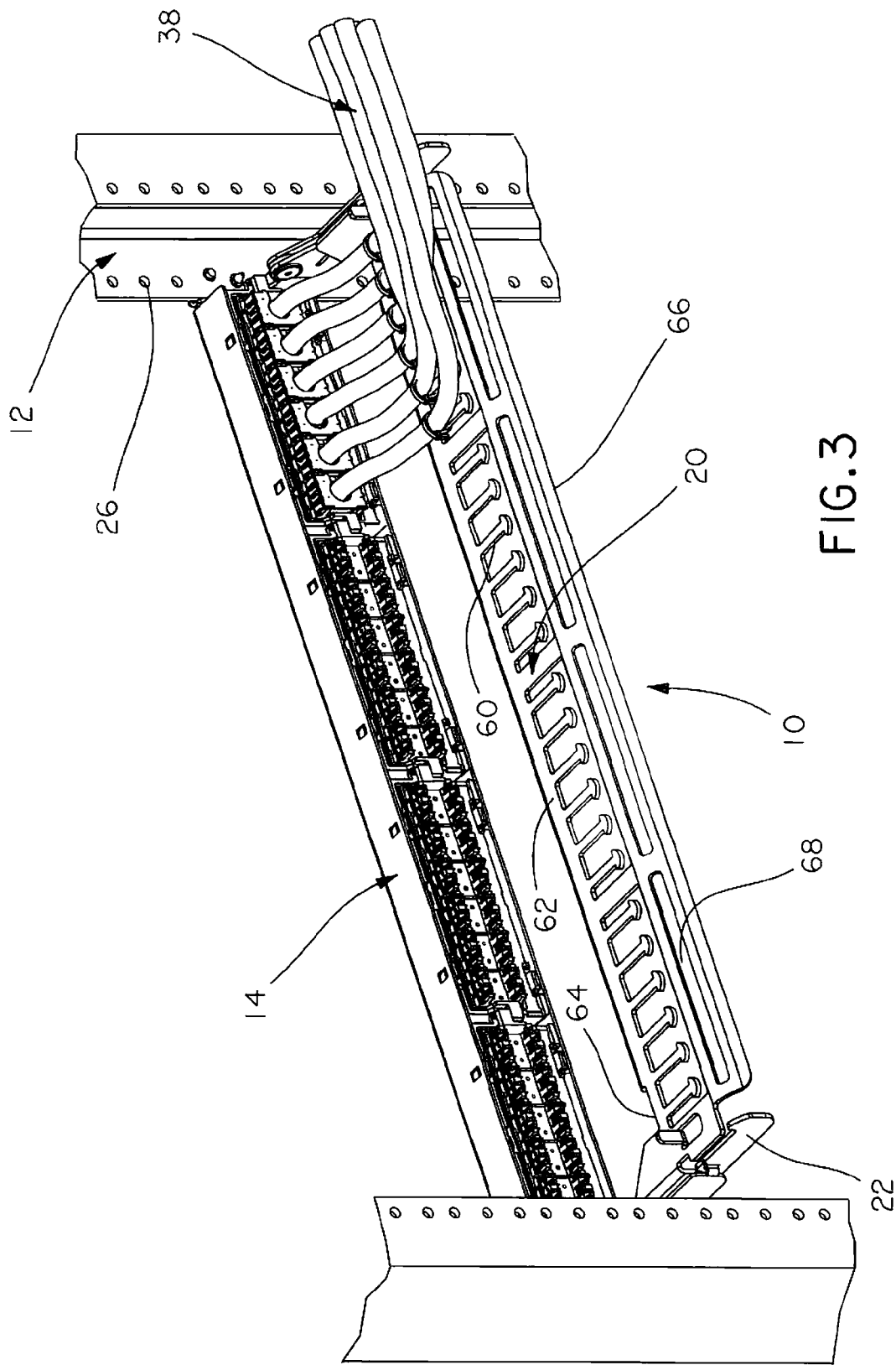
FIG. 3 illustrates a rear perspective view of the pivoting strain relief bar assembly of FIG. 1 coupled to a support rack in the horizontal locked configuration.
Figure 4:
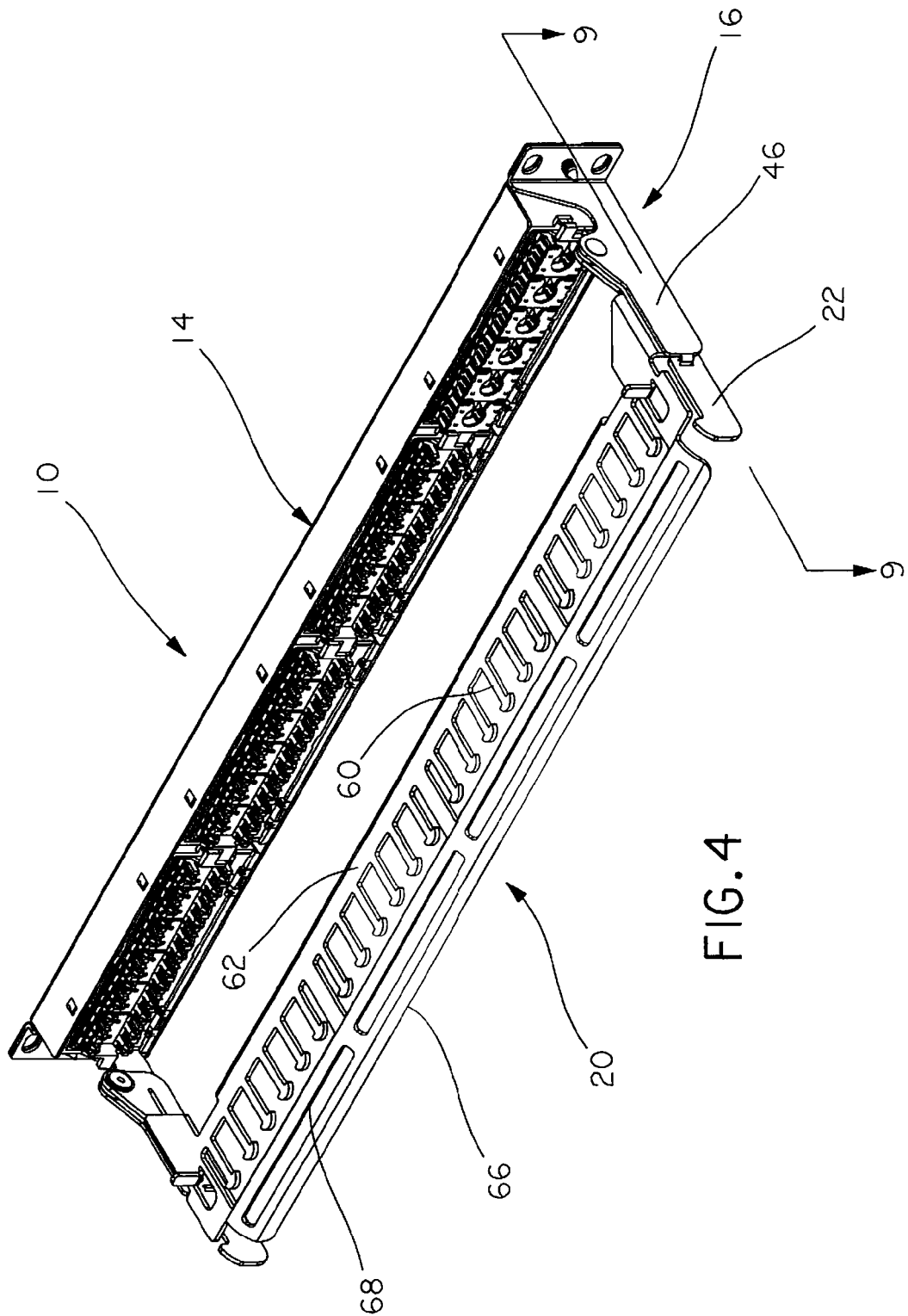
FIG. 4 illustrates a rear perspective view of the pivoting strain relief bar assembly of FIG. 1 in the horizontal locked configuration.

Referring now to the Figures, in which like elements are represented by the same reference numerals, a pivoting strain relief bar assembly for organizing and supporting network data cables is generally indicated in FIG. 1 by reference numeral 10. Pivoting strain relief bar assembly 10 preferably includes a support rack 12, a patch panel 14 coupled to the support rack 12, at least one side bracket 16 coupled to the support rack 12 and the patch panel 14, a bracket latch tab 18 integrally formed on at least one side bracket 16, a strain relief bar 20 rotatably coupled to at least one side bracket 16, and at least one finger tab 22 integrally formed with the strain relief bar 20 wherein the finger tab 22 includes a latch slot 24 adapted to receive the bracket latch tab 18 and thereby lock the strain relief bar 20 in a horizontal configuration. Pivoting strain relief bar assembly 10 preferably includes support rack 12, an embodiment of which is illustrated in FIGS. 1-5 and 11. Support rack 12 is a structure of conventional construction designed to support and allow access to telecommunication equipment or other electronic devices. Support rack 12 is generally comprised of two vertical channel-shaped members coupled to horizontal support beams (not shown). On the surface of the forward facing flanges of the support rack 12, a plurality of support mounting apertures 26 are disposed at regular intervals along a generally vertical axis. The plurality of support mounting apertures 26 are dimensioned to accept mechanical fastening devices, such as bolts or screws, that secure the patch panel 14 to the support rack 12.

Pivoting strain relief bar assembly 10 also preferably includes a patch panel 14, an embodiment of which is illustrated in FIGS. 1-6 and 11. The patch panel 14 is generally comprised of a substantially vertical panel face 28 that includes coplanar panel mounting flanges 30. The panel mounting flanges 30 include panel mounting apertures 32 that are adapted to accept mechanical fastening devices that secure the patch panel 14 to the support rack 12. The panel mounting flanges 30 can also include a fastener slot 34 adapted to accept a mechanical fastening device.

Also disposed on the vertical planar face of the patch panel 14 is a plurality of input jacks 36. The input jacks 36 are adapted to receive and secure the termination located at the terminal end of a network cable 38. It is contemplated that the plug and jack configuration can be one of any known in the art or a combination thereof, including RJ45 plugs and jacks or 8P8C modular plugs and jacks.

Pivoting strain relief bar assembly 10 also preferably includes two side brackets 16, an embodiment of which is illustrated in FIGS. 4-12. Each of the side brackets 16 includes a planar bracket mounting face 40, the surface of the bracket mounting face 40 being substantially parallel to the flange surface of the support rack 12. In one embodiment of the invention, bracket mounting face 40 includes two bracket rack mount apertures 42, the bracket rack mount apertures 42 being disposed near the top and bottom edges of the bracket mounting face 40 and dimensioned to accept mechanical fastening devices, such as bolts or screws, that secure the patch panel 14 to the support rack 12.

In this embodiment of the present invention, the bracket mounting face 40 also includes a bracket ratchet aperture 44, the bracket ratchet aperture 44 being disposed near the center of the bracket mounting face 40 and dimensioned to accept a mechanical fastening device, such as a bolt or screw, that secures the patch panel 14 to the support rack 12. However, it would be obvious to one skilled in the art that the bracket mounting face 40 can have any number of mounting apertures arranged to accommodate the support mounting apertures 26 of the support rack 12. Additionally, the bracket ratchet aperture 44 and bracket rack mount apertures 42 may take on any size and shape known in the art, including round holes or slots.

Each side bracket 16 also includes a planar bracket support surface 46, the bracket support surface 46 generally extends in a direction normal to the bracket mounting face 40 in a substantially vertical direction. The bracket support surface 46 includes a bracket hinge aperture 48, about which the strain relief bar 20 rotates. In one embodiment of the invention, the bracket hinge aperture 48 is located along the upper perimeter edge and near the longitudinal center of the bracket support surface 46. The bracket hinge aperture 48 is dimensioned to receive a bracket rivet 50, the bracket rivet 50 coupling the side bracket 16 to the strain relief bar 20.

Each side bracket 16 can also include at least one bracket latch tab 18 that is coupled to the bracket support surface 46. In one embodiment of the invention, a bracket latch tab 18 is integrally formed with the bracket support surface 46, but it is contemplated that the bracket latch tab 18 could be secured to the bracket support surface 46 in any way known in the art, including the use of mechanical fastening devices, adhesive bonding, or welding. In one embodiment of the invention, the bracket latch tab 18 is disposed on the terminal end of the bracket support surface 46, and is oriented such that the terminal end of the latch tab 18 points in a direction that is substantially toward the finger tab 22 of the strain relief bar 20 such that the terminal end of the latch tab 18 is capable of being received into the substantially vertical latch slot 24 located on the finger tab 22 of the strain relief bar 20. Other embodiments of the present invention may include multiple latch tabs 18 disposed on the bracket support surface 46. It would be obvious to one of skill in the art to dimension or position the latch tab 18 in any configuration that would facilitate engagement of the latch tab 18 with the latch slot 24 located on the finger tab 22 of the strain relief bar 20.

Pivoting strain relief bar assembly 10 also preferably includes a strain relief bar 20, an embodiment of which is illustrated in FIGS. 1-12. The strain relief bar 20 is comprised of a generally planar horizontal portion that is adapted to support network cables 38, and two generally vertical bracket engagement surfaces 52 that are adapted to be rotatably coupled to the side bracket 16.

As previously mentioned, the bracket engagement surface 52 is a generally vertical surface that is substantially parallel to the bracket support surface 46 of the side bracket 16 when the strain relief bar 20 is coupled to the side bracket 16. The bracket engagement surface 52 includes a pivoting hinge aperture 54 that is disposed near the terminal end of the bracket engagement surface 52. The pivoting hinge aperture 54 can be positioned and dimensioned to receive a bracket rivet 50, which serves to couple the side bracket 16 to the bracket engagement surface 52 of the strain relief bar 20. Before the bracket rivet 50 is secured, a nylon washer 56 is positioned between the bracket hinge aperture 48 on the bracket support surface 46 and the pivoting hinge aperture 54 on the bracket support surface 46. Thus, as the bracket rivet 50 is inserted into the bracket hinge aperture 48, the rivet is received into the aperture of the nylon washer 56. As the bracket rivet 50 is further inserted into the bracket hinge aperture 48, the bracket rivet is received into the pivoting hinge aperture 54 on the bracket engagement surface 52 of the strain relief bar 20. A rivet washer 58 is inserted over the portion of the bracket rivet 50 that protrudes from the bracket engagement surface 52. The rivet is then secured in position by any means known in the art, thus rotatably coupling the side bracket 16 and the strain relief bar 20.

As previously mentioned, the bracket engagement surface 52 of the strain relief bar 20 also includes an elongated finger tab 22 that can be integrally formed with the bracket engagement surface 52. The finger tab 22 includes a latch slot 24 positioned and dimensioned to receive the bracket latch tab 18 of the side bracket 16. The finger tab 22 is cantilevered from the bracket engagement surface 52 such that when a horizontal force is applied to the finger tab 22 in a direction substantially normal to the finger tab 22, the finger tab 22 can be horizontally displaced in a direction normal to the bracket engagement surface 52. When the finger tab 22 is displaced, the bracket latch tab 18 disengages from the latch slot 24 of the finger tab 22, thereby unlocking the strain relief bar 20 and allowing the strain relief bar 20 to freely rotate about the bracket rivet 50.

Strain relief bar 20 can also include a plurality of mushroom tabs 60. The mushroom tabs 60 have an elongated body with a head portion disposed at the terminal end of the elongated body, the head portion having a width greater than the width of the elongated body. The plurality of mushroom tabs 60 are integrally formed with a tab runner 62 that extends longitudinally across the strain relief bar 20. The plurality of mushroom tabs 60 are arrayed such that the elongated bodies of the mushroom tabs are substantially normal to the longitudinal axis of the tab runner 62, and the elongated bodies of the individual mushroom tabs 60 are substantially parallel. The mushroom tabs 60 and the space between adjacent mushroom tabs 60 are dimensioned such that cables 38 that are routed to the patch panel input jacks 36 can be secured to the mushroom tabs 60 using fasteners commonly known in the art, such as nylon cable ties or TAK-TY® hook and loop cable ties. To assist in fastening cables 38 to the strain relief bar 20, the tab runner 62 includes one or more runner pockets 64 located on the edge of the tab runner 62. The one or more runner pockets 64 are adapted to receive a TAK-TY® cable tie when the TAK-TY® cable tie is secured to the strain relief bar 20 in a direction normal to the length of the strain relief bar 20.

Strain relief bar 20 can also include a curved flange 66 that is integrally formed with the strain relief bar 20. When the strain relief bar 20 is in a substantially horizontal locked position, the curved flange 66 extends downwardly from the strain relief bar 20 following a substantially curved trajectory. The curved flange 66 also includes one or more elongated flange slots 68 that are disposed longitudinally along the curved flange 66 and dimensioned to receive a TAK-TY® cable tie that is secured to the strain relief bar 20 in a direction normal to the length of the strain relief bar 20. The terminal ends of the curved flange 66 are positioned to act as an emergency stop to prevent overextension and possible permanent deformation of the finger tab 22. Specifically, when an excessive force is applied to the finger tab 22, the finger tab 22 will eventually contact the terminal edge of the curved flange 66, and will thus be prevented from further displacement.

Strain relief bar 20 can also include an integrally formed vertical tab 70. Vertical tab 70 extends perpendicularly upward from the strain relief bar 20, and is positioned between the mushroom tabs 60 and the bracket engagement surface 52. The vertical tab 70 functions to prevent cables 38 from falling into the gap that is created between the bracket support surface 46 of the side bracket 16 and the bracket engagement surface 52 of the strain relief bar 20 when the strain relief bar 20 is rotated.

The operation of the pivoting strain relief bar assembly 10 will now be described in detail with reference to FIGS. 1-12.

To mount the pivoting strain relief bar assembly 10 to the support rack 12, the strain relief bar 20 is first secured to the patch panel 14. Specifically, a ratchet fastener 72 is inserted into the fastener slot 34 on the panel mounting flange 30 of the patch panel 14. The ratchet fastener is then received into the bracket ratchet aperture 44 on the bracket mounting face of the side bracket 16. The ratchet fastener 72 is then tightened, securing the strain relief bar 20 to the patch panel 14. This process is repeated for the remaining side bracket 16.

Figure 5:
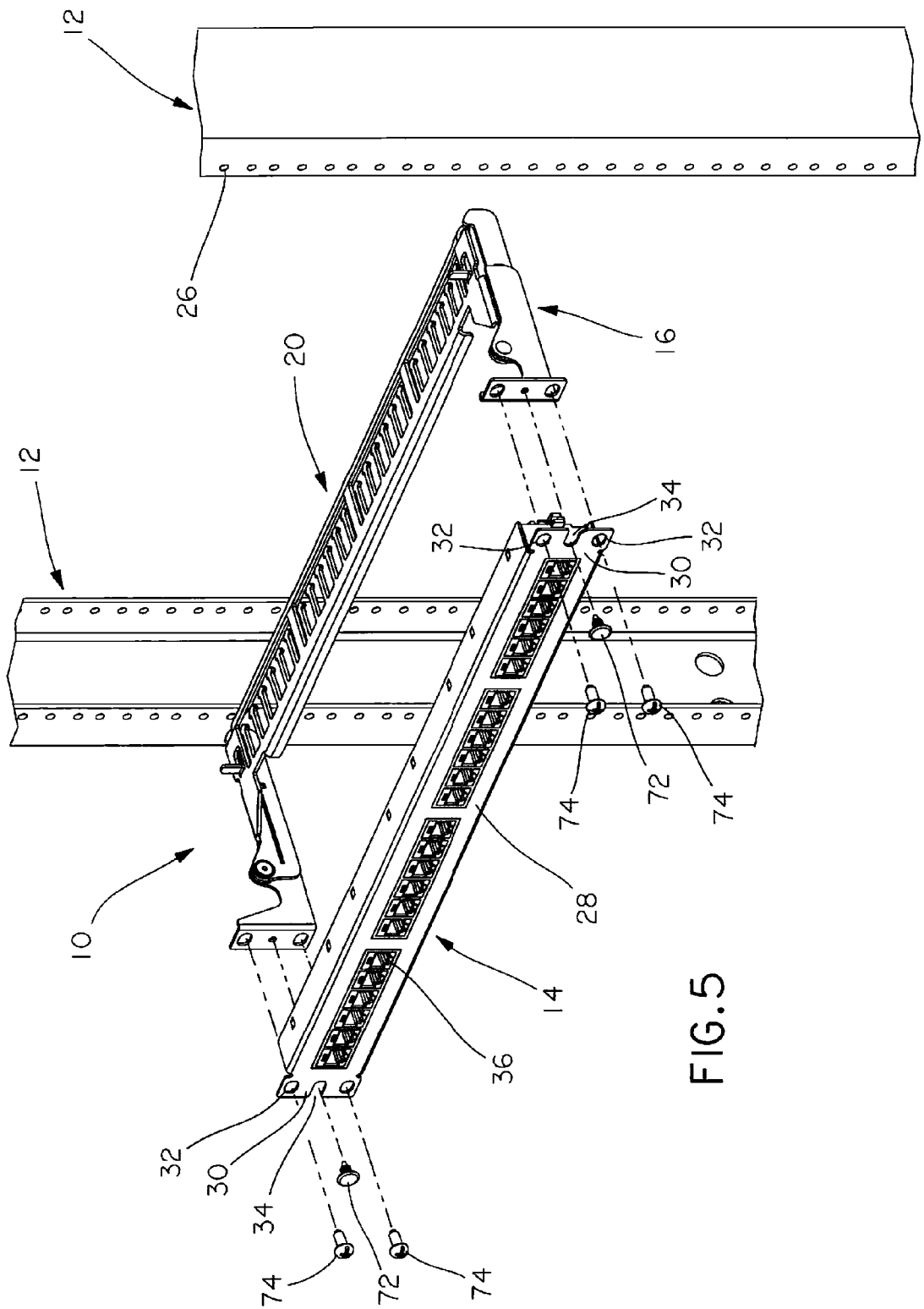
FIG. 5 illustrates a front exploded view of the pivoting strain relief bar assembly of FIG. 1 in the horizontal locked configuration.
Figure 6:
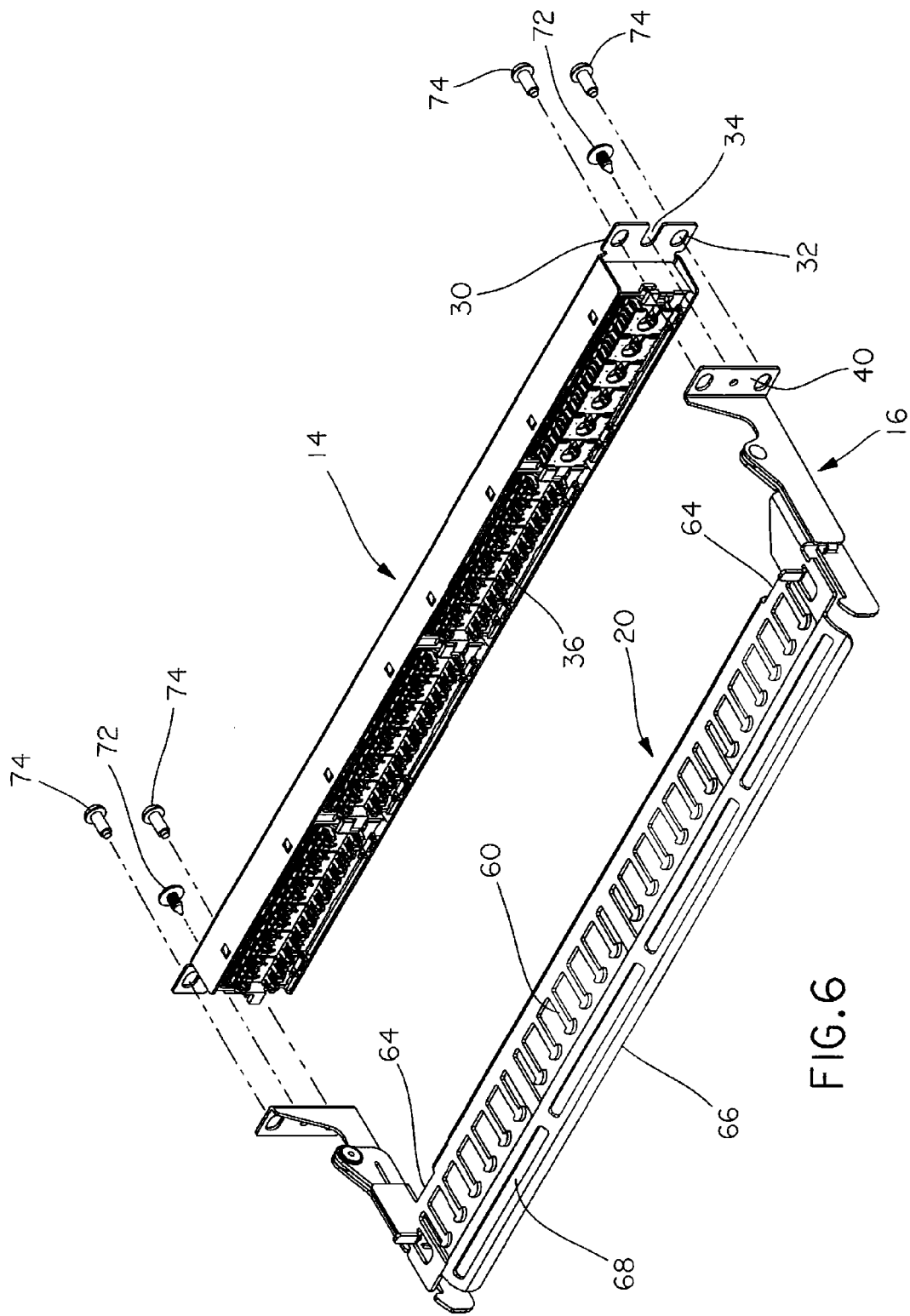
FIG. 6 illustrates a rear exploded view of the pivoting strain relief bar assembly of FIG. 1 in the horizontal locked configuration.
Figure 7:
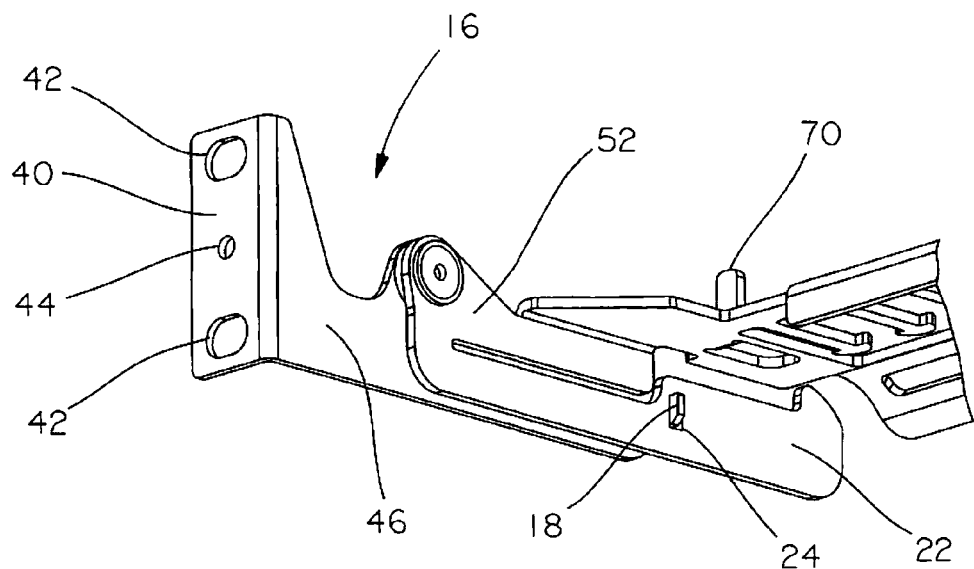
FIG. 7 illustrates a perspective view of the connection between a side bracket and the strain relief bar of the pivoting strain relief bar assembly of FIG. 1.
Figure 8:
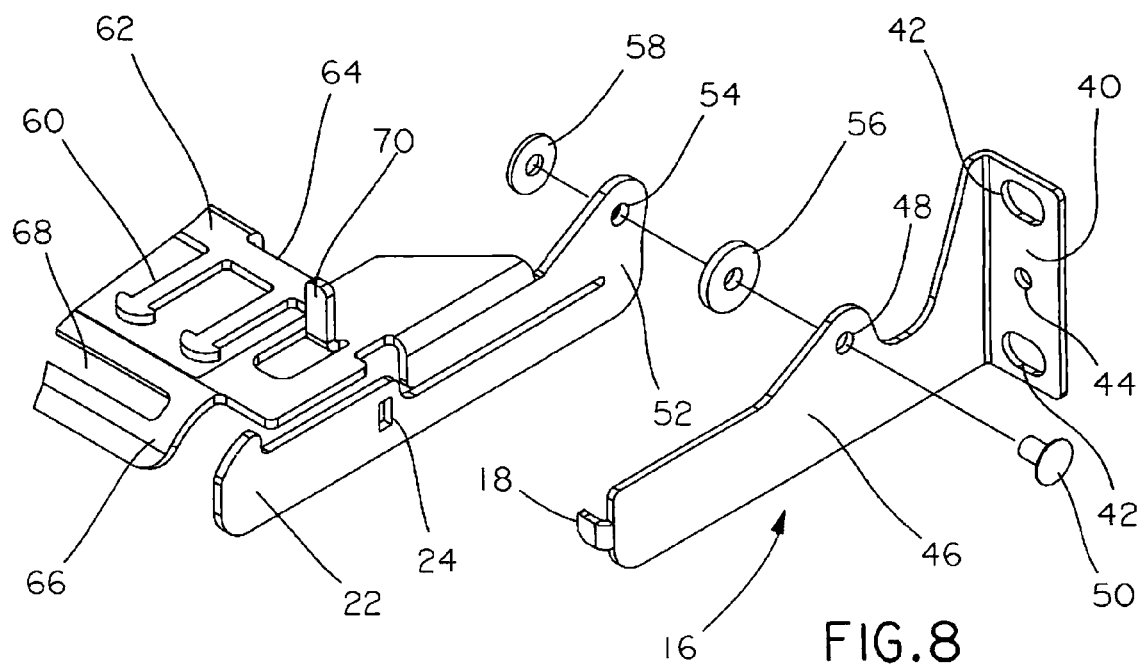
FIG. 8 illustrates an exploded view of the connection between a side bracket and the strain relief bar of the pivoting strain relief bar assembly of FIG. 1.
Figure 11:
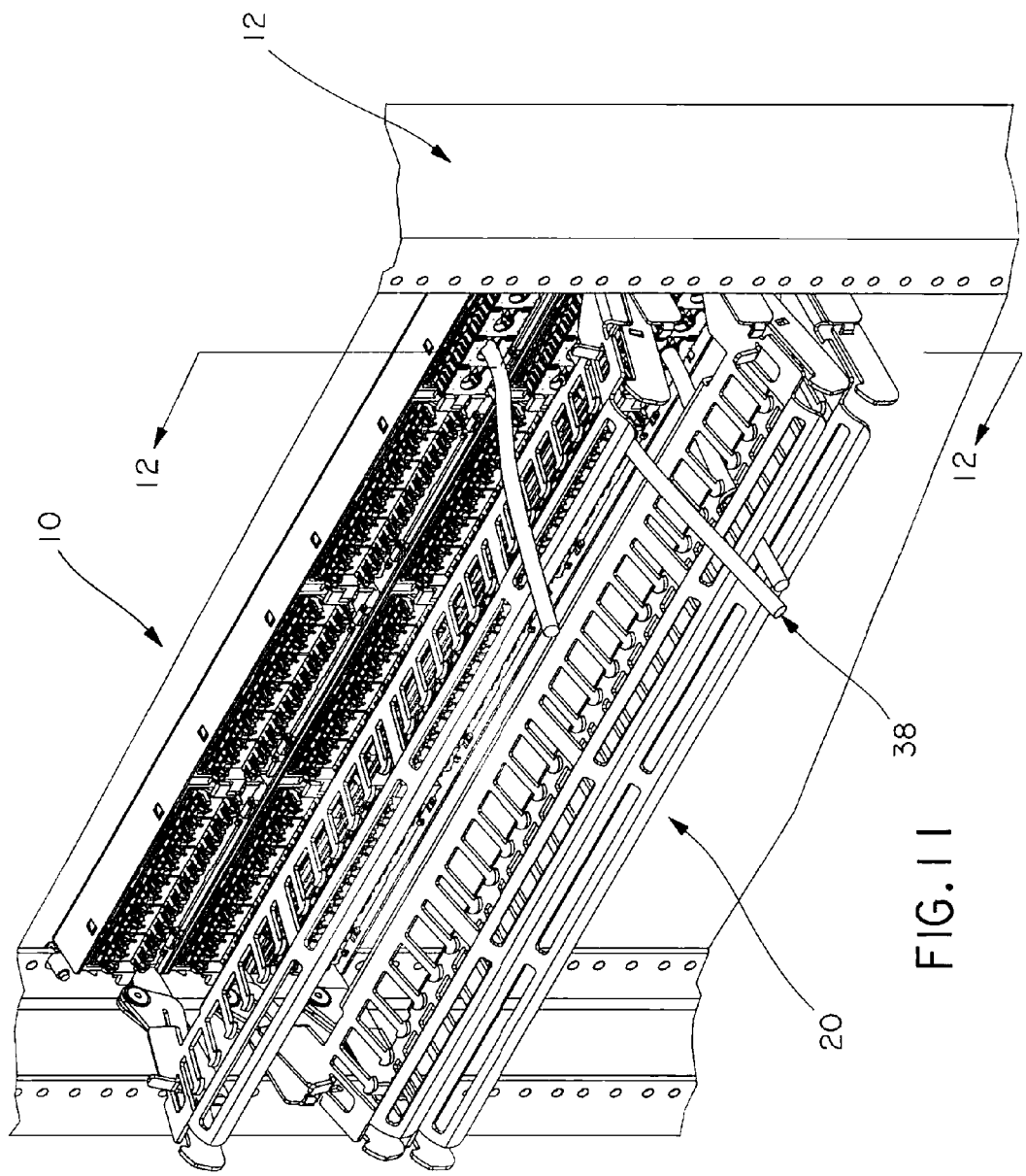
FIG. 11 illustrates a rear perspective view of multiple pivoting strain relief bar assemblies of FIG. 1 coupled to a support rack, with each pivoting strain relief bar in either the horizontal locked configuration or in an unlocked tilted configuration.
Figure 12:
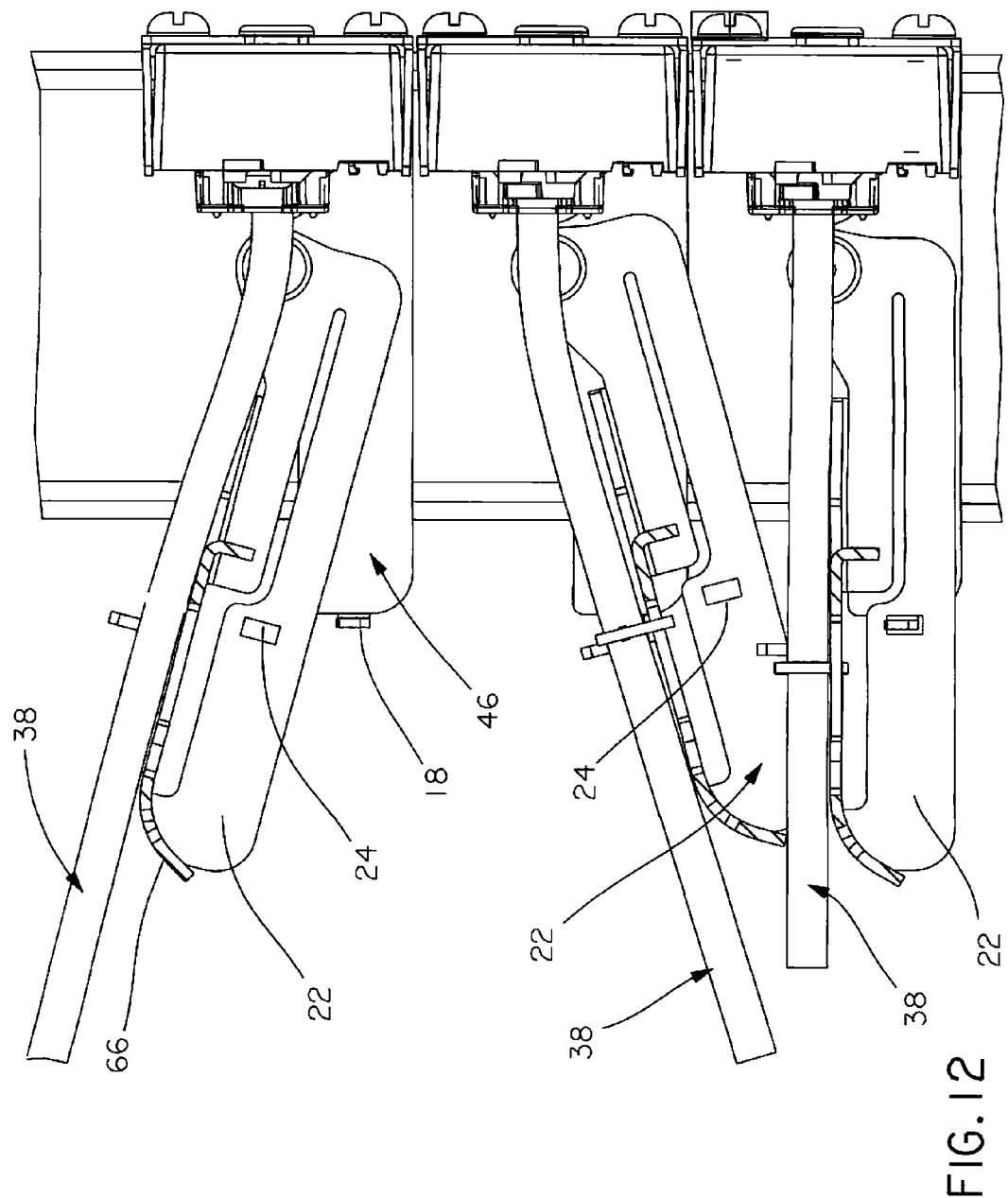
FIG. 12 illustrates a sectional view of the multiple pivoting strain relief bar assemblies of FIG. 11.

To mount the strain relief bar 20 and the patch panel 14 to the support rack 12, the strain relief bar 20 and the patch panel 14 are positioned such that the bracket mounting face 40 of each side bracket 16 mates with the forward facing flange of support rack 12, as illustrated in FIG. 5. The bracket rack mount apertures 42 on the side bracket 16 and the panel mounting apertures 32 on the patch panel 14 are then aligned with the appropriate support mounting apertures 26 of the support rack 12. A rack screw 74 is inserted into each panel mounting aperture 32 and tightened such that the rack screw is received into the bracket rack mount aperture 42 and the support mounting aperture 26.

Cables 38 can then be inserted into the input jacks 36 of the patch panel 14. When the desired number of cables 38 are connected to the patch panel 14, the cables can be secured to the strain relief bar using any means known in the art. For example, the cables 38 can be secured to the mushroom tabs using nylon cable ties. Alternatively, the cables can be secured to the strain relief bar 20 using TAK-TY® cable ties, wherein the TAK-TY® cable tie is wrapped and secured transversely around the strain relief bar 20. The TAK-TY® cable tie can be further secured to the strain relief bar 20 by inserting the TAK-TY® cable tie into the flange slots 68 of the curved flange 66 or by seating the TAK-TY® cable tie in a runner pocket 64 on the strain relief bar 20. Once the cables 38 have been secured to the strain relief bar 20, the cables 38 can be routed outward towards the support rack 12 for further routing.

It is also contemplated that the cables 38 could be inserted into the input jacks 36 of the patch panel 14 prior to the attachment of the pivoting strain relief bar assembly 10 to the support rack 12. In this case, the cables 38 are first attached to the patch panel 14 and secured to the strain relief bar 20 as previously described. The patch panel 14 and the strain relief bar 20 are then secured to the support rack 12 as previously described.

When a technician must access the input jacks 36 of the patch panel 14, the technician applies an inward horizontal force to the finger tabs 22 of the strain relief bar 20. When the finger tabs 22 are displaced, the bracket latch tabs 18 disengage from the latch slot 24 on the finger tab 22, thereby allowing the strain relief bar 20 to freely rotate about the bracket rivet 50. The strain relief bar 20 can then be rotated to a desired position, and be fixed in that position due to the frictional engagement of the nylon washer 56 on the bracket support surface 46 and the bracket engagement surface 52. When the technician wishes to re-secure the strain relief bar 20, the finger tabs 22 can be depressed and the strain relief bar 20 can be rotated back to a horizontal position where the latch slots 24 are aligned with the bracket latch tabs 18. In this position, when the finger tabs 22 are released, the bracket latch tabs 18 are received into the latch slots 24, and the strain relief bar 20 is locked in the horizontal position.

The disclosed Present Invention provides a pivoting strain relief bar assembly that provides adequate structural support for a large number of network cables, and, by allowing for the rotation of the support device, provides a convenient means for a technician to access a patch panel without removing all cables terminated to the patch panel. It should be noted that the above-described and illustrated embodiments and preferred embodiments of the Present Invention are not an exhaustive listing of the forms such a pivoting strain relief bar assembly in accordance with the Present Invention might take; rather, they serve as exemplary and illustrative of embodiments of the Present Invention as presently understood. Many other forms of the Present Invention exist and are readily apparent to one having ordinary skill in the art. For instance, other embodiments of finger tab 22 are also possible without departing from the scope and spirit of the Present Invention. Specifically, the latch tab 18 may be located in any of a number of positions on the finger tab 22. Furthermore, multiple latch tabs 18 designed to engage multiple latch slots 24 can also be used. Moreover, it is contemplated that the strain relief bar 20 can have one finger tab 22 that engages one latch tab 18 on a side bracket 16. Alternatively, as previously described, the strain relief bar 20 can have two finger tabs 22, with a finger tab 22 being coupled to each of the two bracket engagement surfaces 52 of the strain relief bar 20 and each finger tab 22 being designed to engage at least one latch tab 18 coupled to each side bracket 16.

Additionally, the side bracket 16 and the strain relief bar 20 can be rotatably coupled by using any of a number of devices known in the art, including a screw, a bolt, a rivet or a pin. Also, the side bracket 16 and patch panel 14 can be secured to the support rack 12 by any means known in the art, including a bolt or a pin, or by using any number or configuration of mounting apertures. Moreover, it would be understood by one of ordinary skill in the art that features described as "integrally formed" could also be separately formed and coupled to a different feature by any securing means known in the art, including welding, adhesive bonding, or mechanical fastening.

The invention claimed is:

1. A strain relief bar assembly comprising:
   a patch panel;
   a side bracket coupled to the patch panel, the side bracket further comprising a latch tab;
   a strain relief bar; and
   a finger tab coupled to the strain relief bar, the finger tab further comprising a latch slot adapted to receive the latch tab, the finger tab being rotatably coupled to the side bracket such that when the latch tab is engaged with the latch slot, the strain relief bar is locked in position and will not rotate, and when the finger tab is deflected away from the side bracket, the latch tab of the side bracket disengages from the latch slots allowing the strain relief bar to freely rotate.

2. The strain relief bar assembly of claim 1, wherein two side brackets are coupled to the patch panel.

3. The strain relief bar assembly of claim 1, wherein two finger tabs are coupled to the strain relief bar.

4. The strain relief bar assembly of claim 1, wherein the finger tab is integrally formed with the strain relief bar.

5. The strain relief bar assembly of claim 1, wherein the latch tab is integrally formed with the side bracket.

6. The strain relief bar assembly of claim 1, wherein the strain relief bar prevents the finger tab from extending past a predetermined position.

7. The strain relief bar assembly of claim 1, wherein the strain relief bar has a plurality of runner pockets for securing cable ties.

8. The strain relief bar assembly of claim 1, further comprising an integrally formed vertical tab disposed on the strain relief bar.

9. The strain relief bar assembly of claim 1, wherein the side bracket has at least one mounting aperture.

10. The strain relief bar assembly of claim 1, wherein the patch panel has at least one mounting aperture.

11. The strain relief bar assembly of claim 1, further comprising a rack wherein the patch panel is coupled to the rack and the rack is capable of supporting electronic equipment.

12. The strain relief bar assembly of claim 11, wherein the patch panel has at least one mounting aperture for aligning with at least one mounting aperture on the side bracket and at least one mounting aperture on the rack.

13. The strain relief bar assembly of claim 1, wherein the strain relief bar includes integrally formed tabs that are adapted to secure network cable.

14. The strain relief bar assembly of claim 13, further comprising a cable tie that secures the cable to the integrally formed tabs on the strain relief bar.

* * * * *

UNITED STATES PATENT AND TRADEMARK OFFICE
CERTIFICATE OF CORRECTION

| | | |
|---|---|---|
| PATENT NO. | : 7,510,421 B2 | Page 1 of 1 |
| APPLICATION NO. | : 11/837165 | |
| DATED | : March 31, 2009 | |
| INVENTOR(S) | : Robert E. Fransen et al. | |

It is certified that error appears in the above-identified patent and that said Letters Patent is hereby corrected as shown below:

Column 8, Line 22, "disengages from the latch slots allowing" should read "disengages from the latch slot, allowing".

Signed and Sealed this

Eighteenth Day of August, 2009

David J. Kappos
*Director of the United States Patent and Trademark Office*